United States Patent
Lee et al.

(10) Patent No.: US 10,869,219 B2
(45) Date of Patent: Dec. 15, 2020

(54) METHOD AND APPARATUS FOR CONTROLLING TRAFFIC OF TERMINAL IN MOBILE COMMUNICATION SYSTEM

(71) Applicant: SAMSUNG ELECTRONICS CO., LTD., Suwon-si (KR)

(72) Inventors: Suwon Lee, Suwon-si (KR); Changyeong Oh, Suwon-si (KR); Panhyung Lee, Seoul (KR); Soonyoung Yoon, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/093,054

(22) PCT Filed: Apr. 11, 2017

(86) PCT No.: PCT/KR2017/003904
§ 371 (c)(1),
(2) Date: Oct. 11, 2018

(87) PCT Pub. No.: WO2017/179882
PCT Pub. Date: Oct. 19, 2017

(65) Prior Publication Data
US 2019/0159061 A1    May 23, 2019

(30) Foreign Application Priority Data
Apr. 11, 2016    (KR) .................. 10-2016-0044317

(51) Int. Cl.
*H04W 28/02*    (2009.01)
*H04W 24/08*    (2009.01)
(Continued)

(52) U.S. Cl.
CPC ....... *H04W 28/0289* (2013.01); *H04W 24/08* (2013.01); *H04W 28/02* (2013.01);
(Continued)

(58) Field of Classification Search
CPC . H04W 28/00; H04W 28/02; H04W 28/0231; H04W 28/0268; H04W 28/0284;
(Continued)

(56) References Cited

U.S. PATENT DOCUMENTS 6,064,892 A * 5/2000 Miyagawa ............ H04W 16/06
                                                     455/423
9,794,137 B2 * 10/2017 Huang ................ H04L 41/5064
(Continued)

FOREIGN PATENT DOCUMENTS

| CN | 104301250 A | 1/2015 |
|---|---|---|
| KR | 10-2015-0068472 A | 6/2015 |
| WO | 2015/076598 A1 | 5/2015 |

OTHER PUBLICATIONS

Communication dated Sep. 12, 2019 issued by the European Patent Office in counterpart European Patent Application No. 17782637.7.
(Continued)

*Primary Examiner* — Warner Wong
(74) *Attorney, Agent, or Firm* — Sughrue Mion, PLLC

(57) ABSTRACT

The present invention relates to a method and an apparatus for controlling the traffic of a terminal in a mobile communication system and, more particularly, to a method and an apparatus for controlling the traffic of a terminal in consideration of the quality of experience of the terminal within a wireless network. A method for controlling the traffic of a terminal in a mobile communication system, according to one embodiment of the present invention, comprises the steps of: determining whether service congestion has occurred in a wireless network based on user experience quality information on each service of at least one terminal and status information in the wireless network; and controlling traffic of the at least one terminal based on services used
(Continued)

by terminals in the wireless network if it is determined that the service congestion has occurred in the wireless network.

12 Claims, 9 Drawing Sheets

(51) Int. Cl.
*H04L 12/931* (2013.01)
*H04L 12/825* (2013.01)
*H04L 12/801* (2013.01)

(52) U.S. Cl.
CPC .............. *H04L 47/10* (2013.01); *H04L 47/26* (2013.01); *H04L 49/205* (2013.01); *H04W 28/0268* (2013.01)

(58) Field of Classification Search
CPC ............ H04W 28/0289; H04W 24/08; H04W 72/0486; H04W 72/1226; H04W 72/1252; H04L 47/10; H04L 47/11; H04L 47/26; H04L 1/0001; H04L 1/0026; H04L 29/06523; H04L 49/205; H04L 65/80
See application file for complete search history.

(56) References Cited

U.S. PATENT DOCUMENTS

| | | | | |
|---|---|---|---|---|
| 2004/0203825 | A1* | 10/2004 | Daniel | H04W 28/26 455/452.1 |
| 2005/0122900 | A1* | 6/2005 | Tuulos | H04L 41/0893 370/229 |
| 2006/0007934 | A1* | 1/2006 | Chemiakina | H04L 29/06 370/395.4 |
| 2008/0310301 | A1* | 12/2008 | Wade, Jr. | H04N 7/17318 370/230 |
| 2010/0208614 | A1* | 8/2010 | Harmatos | H04L 47/215 370/253 |
| 2013/0138828 | A1 | 5/2013 | Strasman et al. | |
| 2013/0155849 | A1* | 6/2013 | Koodli | H04L 47/808 370/230 |
| 2013/0157679 | A1* | 6/2013 | Van Phan | H04W 76/14 455/452.2 |
| 2013/0194919 | A1 | 8/2013 | Garavaglia et al. | |
| 2013/0223207 | A1 | 8/2013 | Bouchard et al. | |
| 2013/0272121 | A1 | 10/2013 | Stanwood et al. | |
| 2013/0286879 | A1 | 10/2013 | ElArabawy et al. | |
| 2015/0043346 | A1 | 2/2015 | Miller et al. | |
| 2015/0105042 | A1* | 4/2015 | Miller | H04W 76/20 455/404.1 |
| 2015/0117204 | A1 | 4/2015 | Lott et al. | |
| 2015/0208277 | A1* | 7/2015 | De Pasquale | H04L 47/11 370/230.1 |
| 2015/0271827 | A1 | 9/2015 | Hamalainen et al. | |
| 2015/0373588 | A1* | 12/2015 | C K | H04L 41/5022 370/329 |
| 2016/0036710 | A1* | 2/2016 | Hanaoka | H04W 28/0284 370/235 |
| 2016/0295298 | A1 | 10/2016 | Lee et al. | |
| 2016/0295429 | A1* | 10/2016 | Enqvist | H04W 4/18 |
| 2017/0150394 | A1 | 5/2017 | Fan et al. | |

OTHER PUBLICATIONS

Communication dated Nov. 13, 2018, issued by the European Patent Office in counterpart European Application No. 17782637.7.
Zhou, et al., "Deprioritization of Heavy Users in Wireless Networks", Oct. 2011, IEEE Communications Magazine pp. 110-117.
Ramamurthi, et al., "Video-QoE Aware Resource Management at Network Core", Dec. 2014, Communications Software, Services and Multimedia Symposium, Globecom, pp. 1418-1423.
International Search Report (PCT/ISA/210) dated Jul. 18, 2017, issued by the International Searching Authority in counterpart International Patent Application No. PCT/KR2017/003904.
Written Opinion (PCT/ISA/237) dated Jul. 18, 2017, issued by the International Searching Authority in counterpart International Patent Application No. PCT/KR2017/003904.

* cited by examiner

METHOD AND APPARATUS FOR CONTROLLING TRAFFIC OF TERMINAL IN MOBILE COMMUNICATION SYSTEM

TECHNICAL FIELD

The present disclosure relates to a method and an apparatus for controlling traffic of a terminal in a mobile communication system, and more particularly, to a method and an apparatus for controlling traffic of a terminal in consideration of user experience quality for services in a wireless network.

BACKGROUND ART

Since a traffic control method in consideration of the quality of experience for services in the related art controls traffic by indirectly estimating the quality of experience for the services based on a network state or the existing quality of service (QoS)-based network performance index, it is unable to dynamically cope with several situations in the network. Further, since traffic volume in the unit of a cell is controlled, it is difficult to secure graded quality of experience for the services with respect to a specific service that requires the quality of experience for the services, such as video of a specific user.

DISCLOSURE OF INVENTION

Technical Problem

The present disclosure has been made in order to solve the above problems, and an aspect of the present disclosure provides a method and an apparatus for determining whether service congestion has occurred based on a cause of deterioration of user experience quality for services, and dynamically controlling traffic by services used by a user if the service congestion has occurred. Further, another aspect of the present disclosure provides a method and an apparatus for effectively releasing or mitigating traffic control if the state returns to a previous state before the service congestion occurs in a network.

Solution to Problem

In one aspect of the present disclosure, a method for controlling traffic of a terminal in a mobile communication system includes determining whether service congestion has occurred in a wireless network based on user experience quality information on services of at least one terminal and status information in the wireless network, and controlling traffic of the at least one terminal based on services used by terminals in the wireless network if it is determined that the service congestion has occurred in the wireless network.

In another aspect of the present disclosure, an apparatus for controlling traffic of a terminal in a mobile communication system includes a transceiver configured to transmit and receive signals; and a controller configured to determine whether service congestion has occurred in a wireless network based on user experience quality information on services of at least one terminal and status information in the wireless network, and to control traffic of the at least one terminal based on services used by terminals in the wireless network if it is determined that the service congestion has occurred in the wireless network.

Advantageous Effects of Invention

According to the aspects of the present disclosure, dynamic grated control of the traffic for services is performed through association analysis of the user experience quality for services of the terminal and the network state in the mobile communication system, and thus the user experience quality for a specific service can be improved.

MODE FOR THE INVENTION

Figure 1:
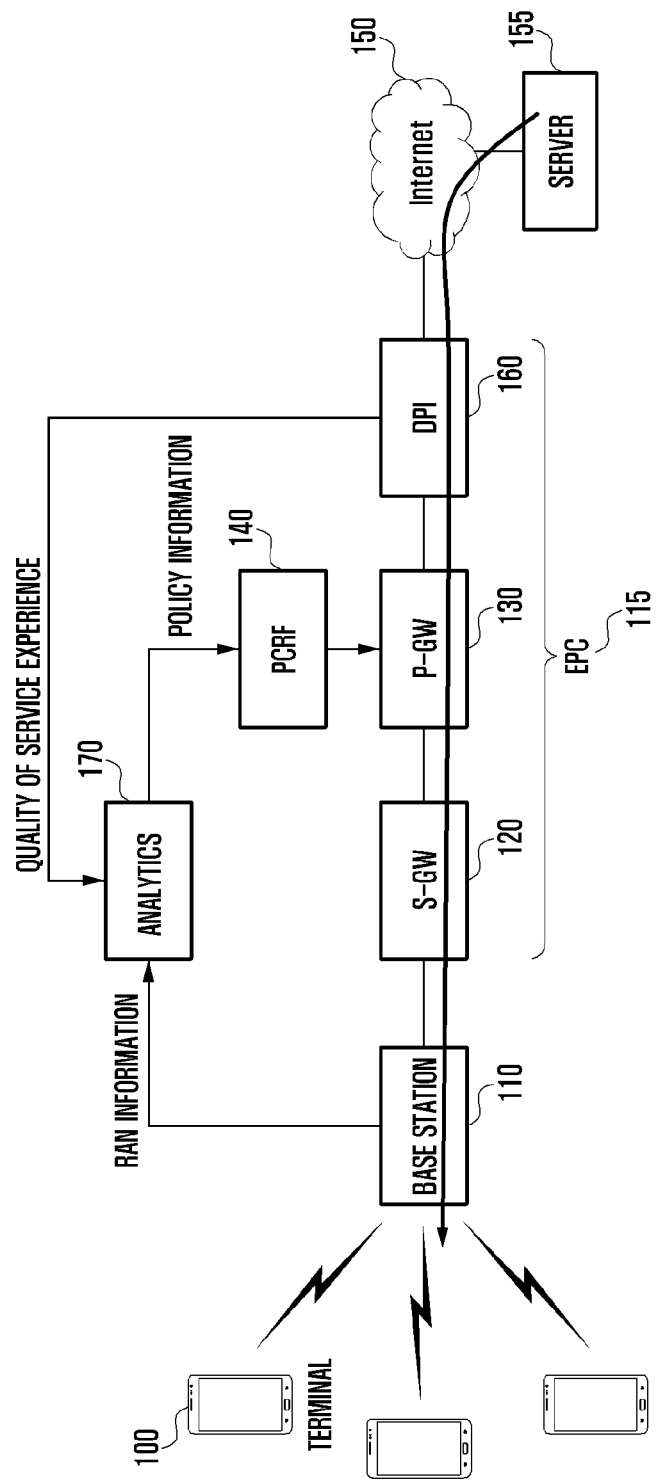
FIG. 1 is a diagram illustrating a network environment for controlling traffic for each service of a terminal according to an embodiment of the present disclosure.

Hereinafter, preferred embodiments of the present disclosure will be described in detail with reference to the accompanying drawings. It is to be noted that the same drawing reference numerals are used for the same elements across the accompanying drawings. In describing the present disclosure, related well-known functions or configurations incorporated herein are not described in detail in the case where it is determined that they obscure the subject matter of the present disclosure.

In describing embodiments of the present disclosure in detail, although a 4G communication system including an advanced E-UTRA (or called LTE-A) that supports carrier aggregation will be the primary subject, the main gist of the present disclosure can be applied to other communication systems having similar technical backgrounds and channel types with slight modifications within a range that does not greatly deviate from the scope of the present disclosure, by the judgment of those skilled in the art to which the present disclosure pertains.

In explaining embodiments of the present disclosure, explanation of technical contents which are well known in the art to which the present disclosure pertains and are not directly related to the present disclosure will be omitted. This is to transfer the subject matter of the present disclosure more clearly without obscuring the same through omission of unnecessary explanations.

For the same reason, in the accompanying drawings, sizes and relative sizes of some constituent elements may be exaggerated, omitted, or briefly illustrated. Further, sizes of the respective constituent elements do not completely reflect the actual sizes thereof. In the drawings, the same drawing reference numerals are used for the same or corresponding elements across various drawings.

The aspects and features of the present disclosure and methods for achieving the aspects and features will be apparent by referring to the embodiments to be described in detail with reference to the accompanying drawings. However, the present disclosure is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the present disclosure is only defined within the scope of the appended claims. In the entire description of the present disclosure, the same drawing reference numerals are used for the same elements.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the functions specified in the flowchart block or blocks. The computer program instructions may also be loaded onto a computer or other programmable data processing apparatus to cause a series of operational steps to be performed on the computer or other programmable apparatus to produce computer implemented processes such that the instructions that execute on the computer or other programmable apparatus provide steps for implementing the functions specified in the flowchart block or blocks.

Also, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used in an embodiment, means, but is not limited to, a software or hardware component, such as FPGA or ASIC, which performs certain tasks. However, "unit" does not mean to be limited to software or hardware. The term "unit" may advantageously be configured to reside on the addressable storage medium and configured to execute on one or more processors. Thus, "unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "units" may be combined into fewer components and "units" or further separated into additional components and "units". Further, the components and "units" may be implemented to operate one or more CPUs in a device or a security multimedia card.

FIG. 1 is a diagram illustrating a network environment for controlling traffic of a terminal according to an embodiment of the present disclosure.

Referring to FIG. 1, a network in which embodiments of the present disclosure are implemented is illustrated, and this network may include a general 3GPP LTE system. Although an LTE or LTE-A system is illustrated in FIG. 1, the main gist of embodiments of the present disclosure can be applied to other communication/computer systems having similar technical backgrounds and system types with slight modifications within a range that does not greatly deviate from the scope of the embodiments of the present disclosure, by the judgment of those skilled in the art to which the embodiments of the present disclosure pertain.

Referring to FIG. 1, a 3GPP mobile communication system, in particular, an LTE system, may include a base station (evolved node B, EUTRAN, ENB, or node B) 110 and a serving gateway (S-GW) 120, and a user terminal (UE) 100 may access an external network through the base station 110, the S-GW 120, and a PDN gateway (P-GW) 130. The P-GW 130 generally has a policy and charging enforcement function (PCEF) 140, and if the PCEF 140 is implemented separately from the P-GW 130, the P-GW 130 may be replaced by the PCEF 140 to be applied.

The policy and charging rules function (PCRF) 140 is a device that controls a policy related to quality of service (QoS) of user, and the policy and charging control (PCC) rule corresponding to the policy may be transferred and applied to the P-GW 130.

The base station 110 is a radio access network (RAN) node, and may perform functions corresponding to a radio network controller (RNC) of a UTRAN system and a base station controller (BSC) of a GERAN system. The base station 110 is connected to the terminal 100 through a radio channel, and plays a similar role to that of the existing RNC/BSC. Hereinafter, the terms "eNB" and "base station" may be mixedly used. Further, the base station 110 may simultaneously use several cells.

The S-GW 120 is a device that provides a data bearer, and generates or removes data bearer context in accordance with the control of a mobility management entity (MME).

According to the present disclosure, a deep packet inspection (DPI) 160 and an analytics 170, which are separate network entities (NEs), are further included in the general LTE system. The analytics 170 may provide user experience quality information for services through analysis of a packet flow from the DPI 160 to the analytics 170 in the network. Further, the analytics 170 may receive resource usage amount/performance information (RAN information) of the wireless network provided from the base station 110.

The analytics 170 may determine whether service congestion has occurred for cells based on the provided information. Further, if it is determined that the service congestion has occurred, the analytics 170 may perform dynamic traffic graded control for services. Thereafter, the analytics 170 may release or mitigate the traffic control in accordance with the network state. The analytics 170 can release or mitigate the graded control and the traffic control of dynamic traffic for services through providing of policy information to the PCRF 140 that performs the traffic control defined in the 3GPP standards.

Although the DPI 160 and the analytics 170 are illustrated as separate network entities in FIG. 1, they may also be included in a network device defined in the P-GW standards. Although it is illustrated in FIG. 1 that the resource usage amount/performance information of the wireless network is directly provided from the base station, they can also be provided through another network device connected to the base station.

Figure 2:
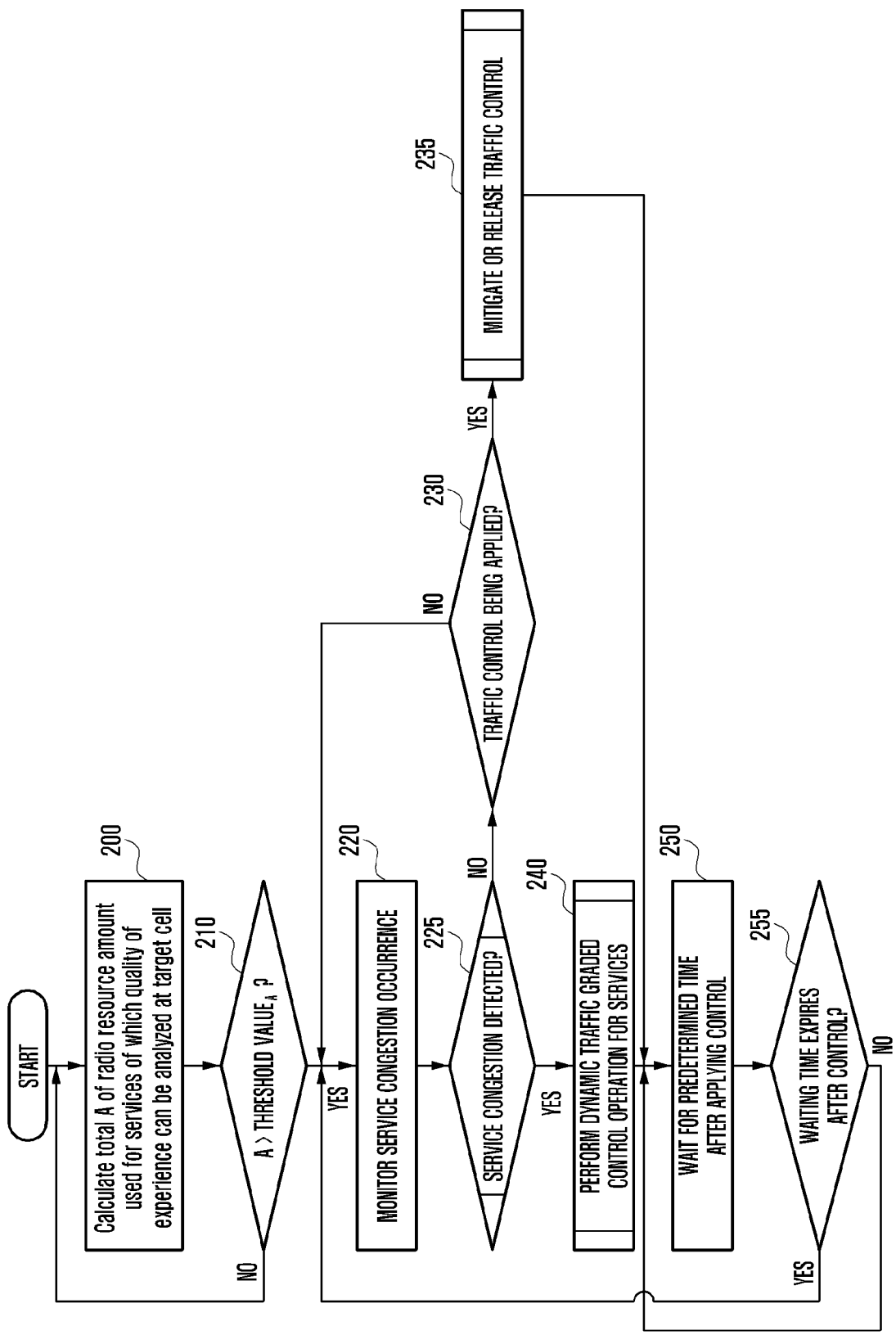
FIG. 2 is a flowchart illustrating a method for controlling traffic for services of a terminal in an apparatus according to an embodiment of the present disclosure.

FIG. 2 is a flowchart illustrating a method for controlling traffic for services of a terminal in an apparatus according to an embodiment of the present disclosure.

As illustrated in FIG. 2, the analytics 170 may control the traffic of the terminal in the network. However, this is merely exemplary, and as described above, the analytics 170 may control the traffic of the terminal as a separate device, or may be included in another network device in the network to control the traffic of the terminal. The term "in the network" may be called "in a target cell" being used by the base station 110. Accordingly, the analyzer 170 can control traffics of a plurality of terminals in the network, and this may mean control of traffics of a plurality of terminals connected to the target cell. However, this is merely exemplary, and according to the present disclosure, the terminal range that can be controlled by the analytics 170 is not limited thereto.

The present disclosure briefly includes a method for detecting deterioration of a user experience quality for services due to radio resource shortage momentarily occurring in the wireless network (method for detecting service congestion), a method for performing dynamic graded control of traffic for services in a core network so as to maintain the quality of experience of a primary service, such as a video to a predetermined level during detection of service congestion, and a method for gradually releasing the traffic control in a core network during service congestion mitigation/release. Hereinafter, a method in which the respective operations as described above are organically connected and operated will be described.

The analytics 170 may calculate the total A of the radio resource amount used for services of which quality of experience can be analyzed in a target cell (200). Thereafter, the analytics 170 may determine whether the calculated total A of the radio resource amount exceeds a predetermined threshold value$_A$. If the calculated total A of the radio resource amount does not exceed the predetermined threshold value$_A$, it means that the radio resource amount used for the services of which the quality of experience can be analyzed is small, and in this case, since it is improper to determine whether the service congestion has occurred, it may return to its initial operation.

If the calculated total A of the radio resource amount exceeds the predetermined threshold value$_A$, the analytics 170 may determine there is a possibility that the service congestion occurs and may monitor the occurrence of the service congestion (220). Thereafter, the analytics 170 may determine whether the service congestion has been detected (225). Whether the service congestion has been detected may be determined based on the quality of experience, the wireless network resource usage amount or real-time association analysis of the performance of a terminal user using a specific service designated by a service provider to secure the quality of experience. More detailed method will be described later with reference to FIGS. 3 and 4. If it is determined that the service congestion has been detected at operation 225, the analytics 170 may perform dynamic traffic graded control operation for services (240). This may include estimating a required radio resource amount for satisfaction of the quality of experience of the target service, and dropping the packet of the user requesting excessive radio resources in order to satisfy the maximum bit rate (MBR) throttling for service data flows (or service sessions or service traffics) for securing the corresponding required radio resource amount in the core network and the quality of experience for the target service. More detailed method will be described later with reference to FIGS. 5 and 6.

Thereafter, the analytics 170 may wait for a predetermined time after the traffic control (250). After waiting until the waiting time expires, the analytics 170 may determine whether the predetermined time expires (255), and if it expires, the analytics 170 may return to operation 220 to determine whether the service congestion has occurred in the cell.

If the service congestion is not detected at operation 225, the analytics 170 may determine whether the traffic control is currently being applied (230). The traffic control may include the graded control of the dynamic traffic for services as described above at operation 240. If the service congestion is not detected and the traffic control is not being applied, the analytics 170 may return to operation 220 to monitor whether the service congestion has occurred.

If the traffic control is being applied and the service congestion is not detected at operation 230, the analytics 170 may mitigate or release the traffic control in the target cell (235). This may include adjusting the dynamic maximum bit rate control level in accordance with the mitigation of the service congestion state, and releasing the bit rate control in accordance with the release of the service congestion state. More detailed method will be described with reference to FIGS. 7 and 8.

Figure 3:
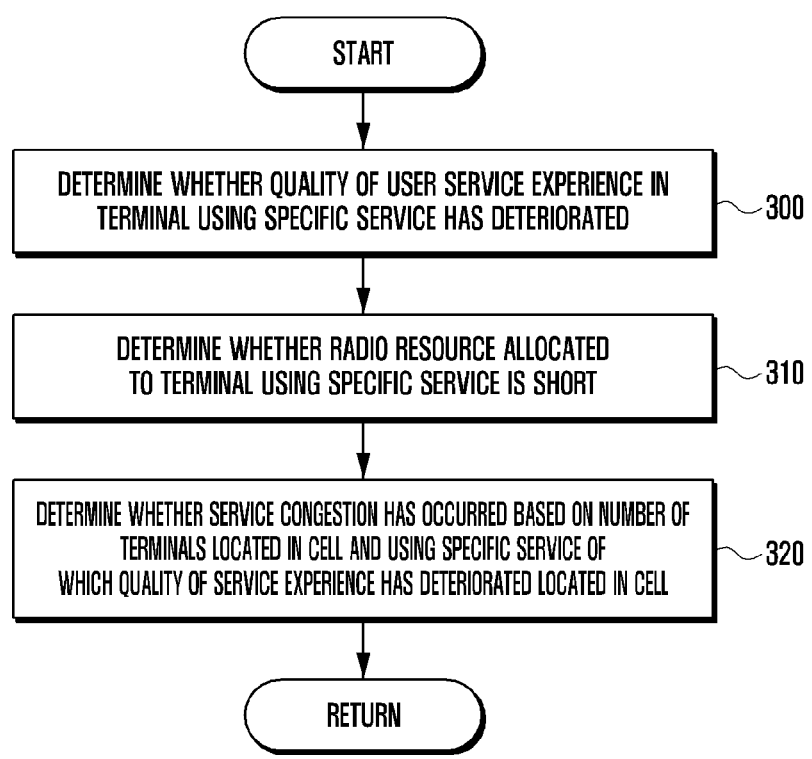
FIG. 3 is a flowchart illustrating a method for determining whether service congestion has occurred in a wireless network of an apparatus according to an embodiment of the present disclosure.

FIG. 3 is a flowchart illustrating a method for determining whether service congestion has occurred in a wireless network of an apparatus according to an embodiment of the present disclosure.

More specifically, referring to FIG. 3, a method for determining whether service congestion has occurred through detection of the service congestion at operation 225 of FIG. 2 will be described. In the present disclosure, a target service of which the service experience quality should be secured for users may be called a specific service. The analytics 170 according to the present disclosure may determine whether the user service experience quality in a terminal using the specific service has deteriorated (300). Thereafter, the analytics 170 may determine whether the quality of experience has deteriorated due to resource shortage in the wireless network in order to determine the cause of the quality of experience deterioration (310). That is, in order to fully achieve the purpose of improvement of the quality of service experience under the dynamic traffic control on a traffic path in the network, the analytics 170 may determine whether the quality of service experience deterioration has occurred due to network bottleneck phenomenon caused by excessive traffic concentration in contrast to the network capacity or momentary congestion state other than other causes, such as terminal CPU/memory performance shortage, terminal app malfunction, server response speed deterioration, and server malfunction. Thereafter, the analytics 170 may finally determine whether the service congestion has occurred based on the number of terminals located in the cell and using the specific service of which the quality of service experience has deteriorated (320). More specifically, if the number of terminals of which the quality of experience has deteriorated due to the wireless network resource shortage among the whole terminals using the specific service in the cell is equal to or larger than a predetermined number of terminals, the analytics 170 may determine that the service congestion has occurred.

Figure 4:
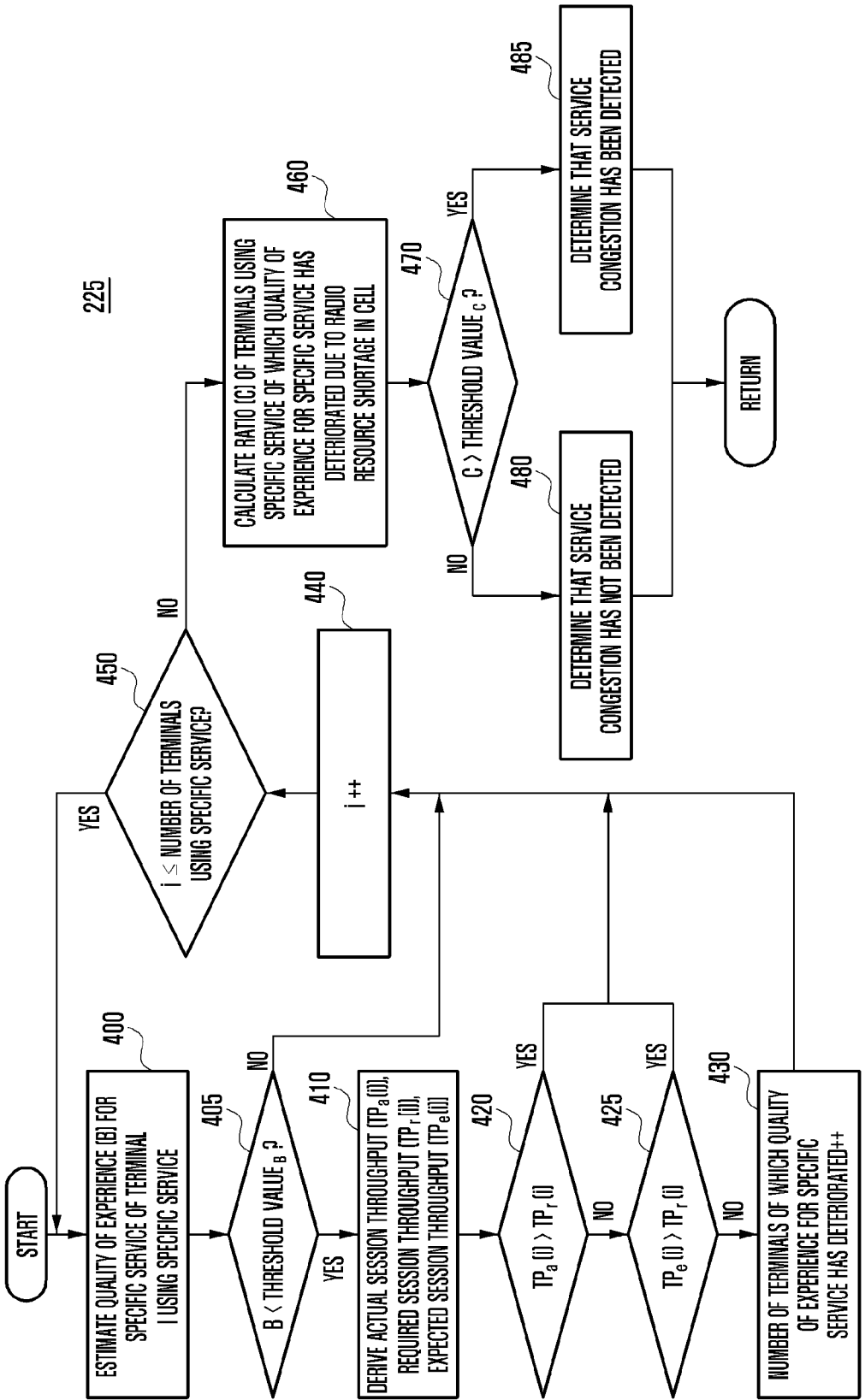
FIG. 4 is a flowchart illustrating a method for determining whether service congestion has occurred in a wireless network of an apparatus according to an embodiment of the present disclosure.

FIG. 4 is a flowchart illustrating a method for determining whether service congestion has occurred in a wireless network of an apparatus according to an embodiment of the present disclosure.

More specifically, FIG. 4 explains the operation 225 of the analytics 170 in FIG. 2 in more detail.

The analytics 170 may estimate the quality of experience B for a specific service requiring the quality of service experience security of a terminal i using the specific service (400). More specifically, the analytics 170 may analyze a packet flow from the network device performing a DPI function in the core network, and may estimate the quality of experience B based on providing of experience quality information for services of each user. The analytics 170 may determine whether the estimated quality of service experience B is lower than a predetermined threshold value$_B$ (405). If the quality of service experience B is equal to or higher than the predetermined threshold value$_B$, the analytics 170 may increase one terminal index i (440), and may determine whether the terminal index i is equal to or lower than the number of all terminals using the specific service (450). If the terminal index i is equal to or lower than the number of all terminals using the specific service, the analytics 170 may return again to operation 400 to estimate the quality of service experience B of the terminal i using the specific service.

If it is determined that the estimated quality of service experience B is lower than the predetermined threshold value$_B$ at operation 405, the analytics 170 may derive an actual session throughput (TP$_a$(i)) for the specific service of the terminal i, required session throughput (TP$_r$(i)) for the specific service, and expected session throughput (TP$_e$(i)) for the specific service (410). The required session throughput (TP$_r$(i)) for the specific service of the terminal calls the required session throughput that is necessary for the security for experience quality for the specific service of the terminal i using the specific service. The expected session throughput (TP$_e$(i)) for the terminal calls the expected session throughput in case where the remaining radio resource is additionally allocated from the base station. The session has the same meaning as the meaning of the service flow or service traffic, and in the present disclosure, they can be mixedly used.

Thereafter, the analytics 170 performs an operation for determining whether the quality of experience has deteriorated due to shortage of the radio resource amount allocated to the terminal i of which the quality of experience B is lower than the threshold value$_B$. The analytics 170 may determine whether the actual session throughput (TP$_a$(i)) is higher than the required session throughput (TP$_r$(i)) (420). If the actual session throughput (TP$_a$(i)) is not higher than the required session throughput (TP$_r$(i)), the analytics 170 may determine whether the expected session throughput (TP$_e$(i)) is higher than the required session throughput (TP$_r$(i)) (425). If both the actual session throughput and the expected session throughput are not higher than the required session throughput, the analytics 170 may determine that the quality of experience has deteriorated due to the shortage of the radio resource amount allocated to the terminal i, and may increase the number of terminals subject to the quality of service experience deterioration (430). That is, the analytics 170 can determine more accurately that the quality of experience has deteriorated due to the shortage of the radio resource amount allocated to the terminal i in case where not only the actual session throughput is not higher than the required session throughput but also the expected session throughput when the remaining radio resource is additionally allocated from the base station is not higher than the required session throughput.

Thereafter, the analytics 170 may increase the terminal index i (440), and may determine whether the terminal index i is equal to or smaller than the number of all terminals using the specific service (450). If the terminal index i is equal to or smaller than the number of all terminals using the specific service, the analytics 170 may return to operation 400 to estimate the quality of service experience B of the terminal i using the specific service. If the terminal index i that is increased at operation 440 exceeds the number of all terminals using the specific service, the analytics 170 may determine that the check has been completed with respect to all the terminals i, and may calculate a ratio C of the terminal using the specific service, of which the quality of service experience has deteriorated due to the shortage of the radio resource amount in the cell (460).

$C$=the number of terminals subject to quality of service experience deterioration/the number of terminals using specific service  [Mathematical expression 1]

The analytics 170 may determine whether the value C calculated at operation 460 exceeds a specific threshold value$_C$ (470), and if the value C is equal to or smaller than the specific threshold value$_C$, the analytics 170 may determine that the service congestion has not been detected (480). If the value C exceeds the specific threshold value$_C$, the analytics 170 may determine that the service congestion has been detected (485). Thereafter, the analytics 170 may perform an operation subsequent to operation 225 of FIG. 2 in accordance with operations 480 and 485.

Figure 5:
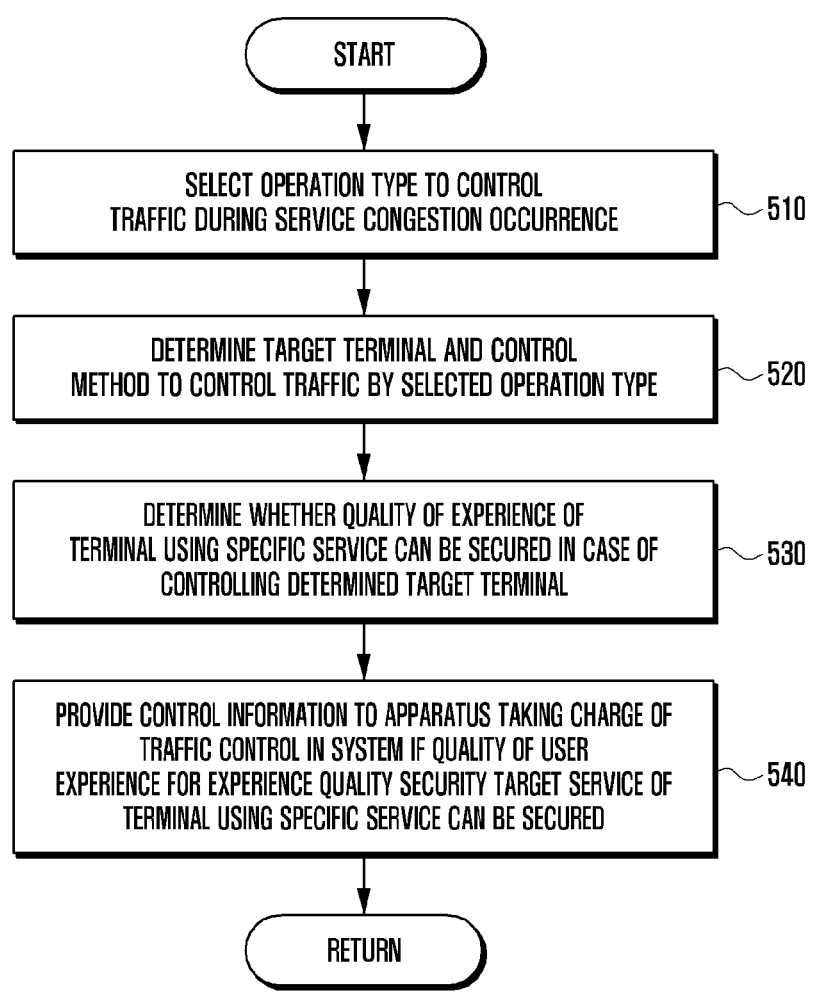
FIG. 5 is a flowchart illustrating a method for dynamic traffic graded control for services of an apparatus according to an embodiment of the present disclosure.

FIG. 5 is a flowchart illustrating a method for dynamic traffic graded control for services of an apparatus according to an embodiment of the present disclosure.

Referring to FIG. 5, an operation for dynamic traffic graded control for services of operation 240 in FIG. 2 will be described. If it is determined that the occurrence of the service congestion has been detected in the cell at operation 225 of FIG. 2, the analytics 170 performs the following operation. First, the analytics 170 can select an operation type to control the traffic (510). In various embodiments of the present disclosure, the operation type may include three operation types in accordance with a weighted target during the graded traffic control for services.

It is assumed that a service requiring security for quality of service experience is service A, and a service not requiring security for quality of service experience is service B. In operation type 1, traffic for service B of terminals using service B is first controlled, and if it is difficult to secure the quality of experience of terminals using service A, the service A is preferentially dropped with respect to terminals of which quality of experience improvement is difficult among the terminals using the service A, so that the experience quality deterioration for service A of other terminals using the service A can be prevented. In this case, the traffic for service B of the terminals using the service B may be controlled in a manner that the maximum bit rate (MBR) for making it possible to provide a radio resource amount necessary for the experience quality security with respect to the service A of the terminals using the service A of which the quality of experience deterioration has occurred is simultaneously equally configured.

In operation type 2, the service A of respective terminals can be successively dropped in accordance with a determined priority until the target quality of experience of the terminals of which the quality of experience for service A has deteriorated among the terminals using the service A can be secured. The operation type 2 will be described in more detail. The service A of the terminals having higher priorities for dropping among the terminals which use the service A and of which the quality of experience has deteriorated is dropped, but the number of terminals dropping the service A can be determined by comparing the radio resource amount (PRB) that can be acquired through the traffic dropping for service A with the radio resource amount (PRB) that is necessary for the remaining terminals, which are not the target for dropping, but suffer from the quality deterioration for the service A, to solve the quality of experience deterioration.

Operation type 3 is similar to the operation type 1, and in operation type 3, unlike the operation type 1, the traffic for service B of the terminals using the service B is not simultaneously configured at the same MBR, but during the traffic control for service B of the terminals using the service B, control target priorities for terminals are determined, and the terminals having higher priorities among the determined priorities and using the service B can be controlled to be successively configured at a determined MBR with respect to the service B until the target quality of experience for service A of the terminals using the service A can be secured. It may be preferable to determine the operation type in a manner desired by a network service provider.

In addition to the above-described operation types 1, 2, and 3, the dropping may be applied most preferentially with respect to the terminals of which the quality of experience has deteriorated due to another cause that is not the shortage of the radio resource amount among the terminals using the service A. That is, through the operation types 1, 2, and 3, the terminals of which the quality of experience has deteriorated due to another cause that is not the shortage of the radio resource amount among the terminals using the service A may be dropped, and thereafter, the traffic of the terminals may be controlled in accordance with the respective operation types. For example, in case of using the operation type 3, the graded control of the traffics for services of the terminals in the cell can be performed in a manner that the terminals of which the quality of experience has deteriorated due to another cause that is not the shortage of the radio resource amount among the terminals using the service A are dropped, the service B of the terminals using the service B is successively configured at the determined MBR, and the service A of the terminals of which the quality of experience has deteriorated due to the shortage of the radio resource amount among the terminals using the service A is dropped.

Thereafter, the analytics 170 may determine a target terminal and control method to control the traffic in accordance with the operation type determined at operation 510 (520). More specifically, how the MBR for services of the whole users in the cell is configured is determined, and if the MBR is larger than 0, it may be determined as the maximum bit rate throttling for services, whereas if the MBR is 0, it may be determined as packet discard or service dropping. Thereafter, in case of controlling the determined target terminal, the analytics 170 may determine whether improvement for the quality of experience for the terminal using a specific service is possible (530). That is, when the MBR configuration in accordance with the graded control method for services according to the present disclosure is applied, the analytics 170 may determine whether to apply the actual traffic control to a core network by determining if the quality of experience of the specific service can actually be improved during applying the MBR configuration in accordance with the graded control method.

Thereafter, if the improvement for user experience quality for an experience quality security target service is possible in case where the traffic is controlled for a service session of the determined target terminal, the analytics 170 may provide the corresponding control information to a device taking charge of the traffic control in the system (540). For example, in 3GPP LTE, PCRF and policy and charging enforcement function (PCEF) perform the corresponding function, and the PCEF is mainly implemented in the P-GW.

Figure 6:
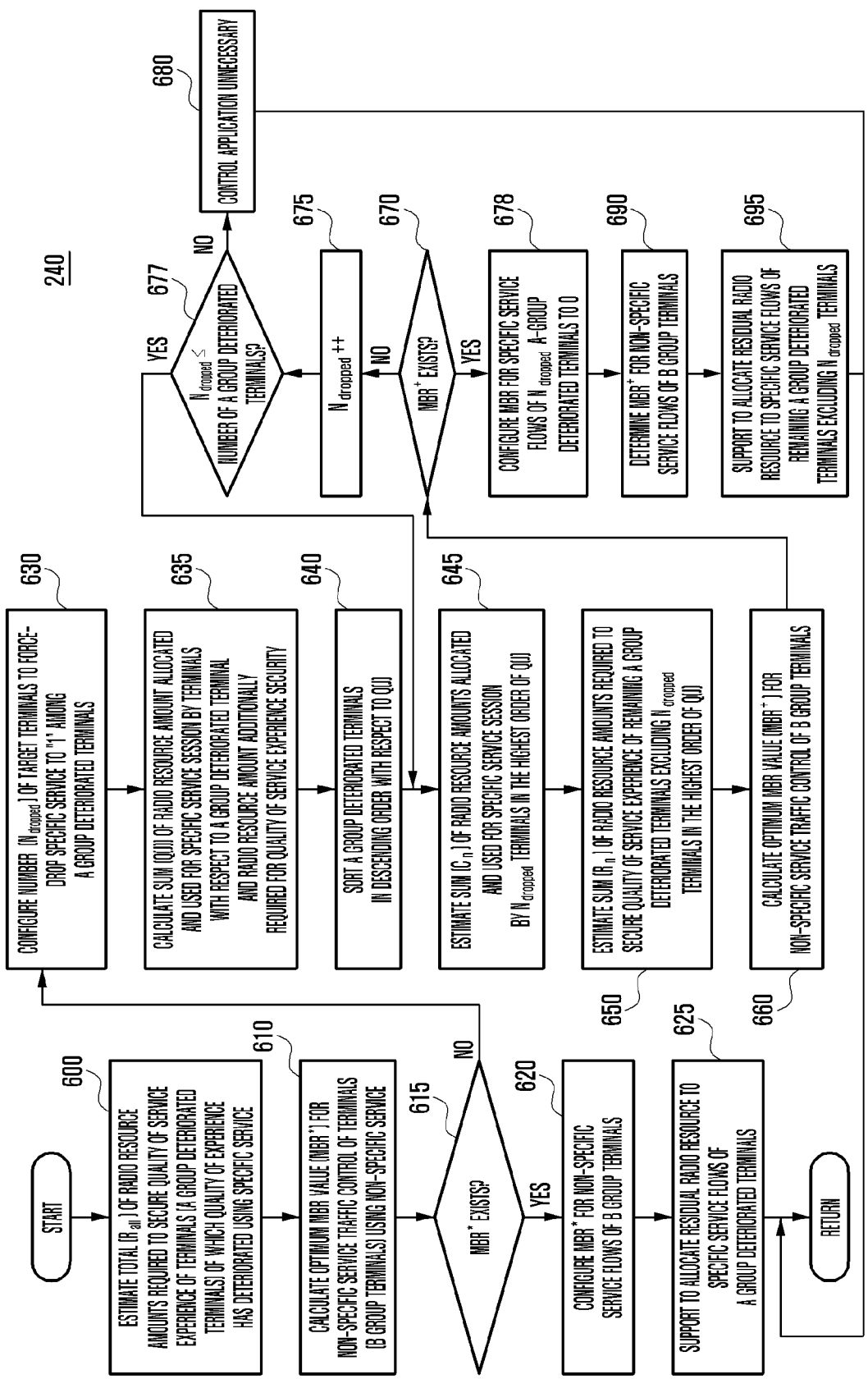
FIG. 6 is a flowchart illustrating a method for dynamic traffic graded control for services of an apparatus according to an embodiment of the present disclosure.

FIG. 6 is a flowchart illustrating a method for dynamic traffic graded control for services of an apparatus according to an embodiment of the present disclosure.

More specifically, referring to FIG. 6, operation 240 will be described in detail in case of applying operation type 1 of the analytics 170 as described above with reference to FIG. 2. The analytics 170 can estimate the total $R_{all}$ of the radio resource amount required to secure the service experience quality of terminals which uses a specific service and of which user experience quality has deteriorated (hereinafter referred to as "A group deteriorated terminals) (600). The radio resource amount may be calculated based on a physical resource block (PRB) usage amount. Thereafter, the optimum MBR value (MBR*) for traffic control of terminals using the non-specific service (hereinafter referred to as "B group terminals) may be calculated through mathematical expression 2 below (610). The MBR is the maximum bit rate that is one of QoS parameters, and calls the maximum bandwidth permitted for traffic transmission for services.

[Mathematical expression 2]
$$\left( \sum_{\forall i} \text{Session\_PRB}^{UE_B}(i) \times \frac{\max(TP_a^{UE_B}(i) - MBR^*, 0)}{TP_a^{UE_B}(i)} \right) > R_{all}$$

Session_PRB$^{UE_B}$(i). PRB usage amount of a non-specific service session of a B group terminal $TP_a^{UE_B}(i)$: Actual non-specific service session throughput of a B group terminal If it is assumed that PRBs, which is in proportion to the remaining session throughput of limited session throughput in which MBR* is configured among PRB usage amount used by respective terminals themselves belonging to B group through mathematical expression 2, are allocation-released from the B group terminals and are allocated to a specific service session of the A group deteriorated terminals, it is possible to derive the MBR* value that is equal to or larger than the total $R_{all}$ of the radio resource amount required to secure the service quality of experience of the A group deteriorated terminals. Further, it is also possible to additionally identify whether the MBR* value satisfies the range of $MBR_{min} \leq MBR^* \leq MBR_{max}$ predetermined by a service provider.

Thereafter, the analytics 170 may determine whether the MBR* value satisfying the mathematical expression 2 exists (615). If the calculated MBR* exists, the analytics 170 may configure the MBR* with respect to non-specific service flows of the B group terminals (620). Thereafter, the analytics 170 may configure the sessions of the B group terminals at MBR*, and may support to allocate the remaining radio resources $$\left( \sum_{\forall i} \text{Session\_PRB}^{UE_B}(i) \times \frac{\max(TP_a^{UE_B}(i) - MBR^*, 0)}{TP_a^{UE_B}(i)} \right)$$

to specific service sessions of the A group deteriorated terminals (625). That is, the analytics 170 may support a radio resource scheduler of the base station to allocate the radio resources to specific service sessions of the A group deteriorated terminals. Thereafter, the analytics 170 may return to operation 250 to perform the subsequent operation.

On the other hand, if it is determined that MBR* does not exist at operation 615, the analytics 170 may configure the number ($N_{dropped}$) of force dropping target terminals of a specific service session to "1" in order to select terminals to be force-dropped among the A group deteriorated terminals (630). Thereafter, the analytics 170 may calculate the sum Q(j) of the radio resource amount allocated and used for specific service session by terminals and the radio resource amount additionally required to secure the user experience quality for the specific service by terminals with respect to the A group terminals (635). The parameter j is an index of the A group deteriorated terminal. Thereafter, the analytics 170 may sort the A group deteriorated terminals in descending order with respect to Q(j) (640). That is, the priority for force dropping for a specific service session among the A group terminals is based on the value Q(j), and as the value Q(j) of the terminal becomes larger, higher priority can be given. This is to consider both the cost (radio resource amount) for improving the deterioration state of the user experience quality and efficiency (radio resource amount) that can be obtained in case where the state improvement of the corresponding terminal is abandoned.

Thereafter, the analytics 170 may estimate the sum $C_n$ of radio resource amounts that the $N_{dropped}$ terminals are allocated and used for the specific service session in the highest order of Q(j) (645). Thereafter, the analytics 170 may estimate the total $R_n$ of radio resource amounts required to secure the service quality of experience of the remaining A group deteriorated terminals excluding the $N_{dropped}$ terminals in the highest order of Q(j) (650).

Thereafter, the analytics 170 may calculate the optimum MBR value (MBR⁺) for service flow control of the B group terminals as in mathematical expression 3 below using the calculated $C_n$ and $R_n$ (660).

[Mathematical expression 3]
$$\left( \sum_{\forall i} \text{Session\_PRB}^{UE_B}(i) \times \frac{\max(TP_a^{UE_B}(i) - MBR^+, 0)}{TP_a^{UE_B}(i)} \right) \geq R_n - C_n$$

$$MBR_{min} \leq MBR^+ \leq MBR_{max}$$

Session_PRB$^{UE_B}$(i): PRB usage amount of non-specific service session of B group terminal $TP_a^{UE_B}$(i): Actual non-specific service session throughput of B group terminal Mathematical expression 3, in the same manner as mathematical expression 2, if PRBs that are in proportion to the remaining session throughput of limited non-specific service session throughput in which the MBR⁺ is configured among PRB usage amounts used by respective terminals belonging to B group are released from B group terminals and are allocated to specific service sessions of A group deteriorated terminals, MBR⁺ values can be derived, which are equal to or larger than the total ($R_n$–$C_n$) of the radio resource amounts required to secure the service quality of experience of the terminals excluding the force-dropped terminals among the A group deteriorated terminals. Further, it can be additionally identified whether the MBR+ values satisfy the range predetermined by a service provider.

Thereafter, the analytics 170 may determine whether the MBR⁺ values satisfy the mathematical expression 2 (670). If the calculated MBR⁺ exists, the analytics 170 may configure the MBR for service flows of the $N_{dropped}$ A group deteriorated terminals to "0" (678). Thereafter, the analytics 170 may configure the MBR⁺ with respect to the non-specific service flows of the B group terminals (690). After configuring the service flows of the B group terminals to MBR⁺, the analytics 170 may support to allocate the remaining radio resources to specific service flows of the terminals excluding the force-dropped terminals with respect to the specific service flows among the A group terminals (695). That is, the analytics 170 may support a radio resource scheduler of the base station to allocate the radio resources to the specific service flows of the A group deteriorated terminals. Thereafter, the analytics 170 may return to operation 250 of FIG. 2 to perform the subsequent operation.

On the other hand, if the MBR* derived through mathematical expression 3 does not exist at operation 670, the number ($N_{dropped}$) of force dropping target terminals of the specific service sessions may be increased by 1 (675). Thereafter, the analytics 170 may determine whether the $N_{dropped}$ is equal to or smaller than the number of A group terminals (677). If the $N_{dropped}$ is equal to or smaller than the number of A group terminals, the analytics 170 returns again to operation 645 to repeat the following operation with respect to the increased $N_{dropped}$ terminals. If the $N_{dropped}$ is larger than the number of A group terminals, the analytics 170 may determine that there is no terminal capable of securing the quality of service experience in A group to determine that the control application is unnecessary even if the specific service sessions of all the A group terminals are force-dropped (680), and may return to operation 250 of FIG. 2 to perform the subsequent operation. On the other hand, the number of A group terminals that is compared with $N_{dropped}$ at operation 677 corresponds to an embodiment of the present disclosure, and the number of terminals to force-drop the specific service sessions that become the basis to determine that the control application is unnecessary may be predetermined by a service provider.

Figure 7:
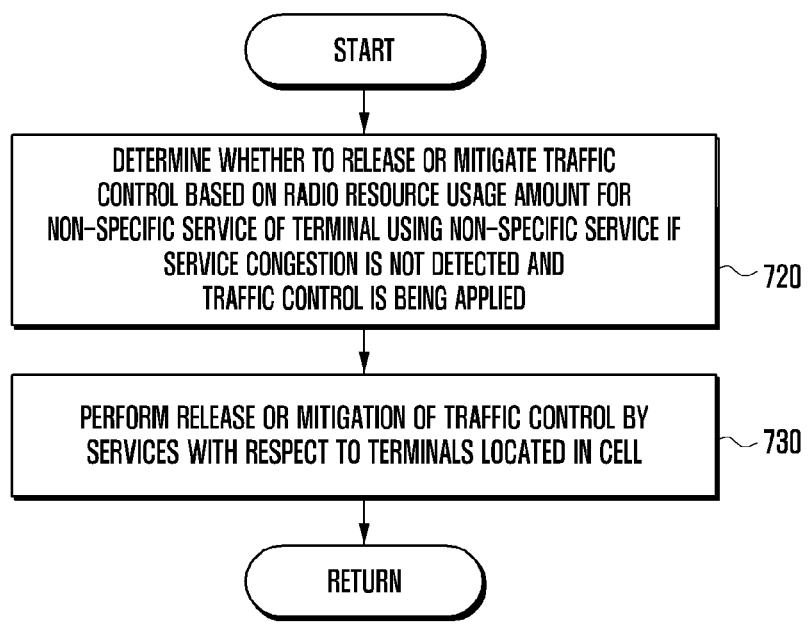
FIG. 7 is a flowchart illustrating a method for releasing or mitigating traffic control of an apparatus according to an embodiment of the present disclosure.

FIG. 7 is a flowchart illustrating a method for releasing or mitigating traffic control of an apparatus according to an embodiment of the present disclosure.

More specifically, referring to FIG. 7, operation 235 of the analytics 170 as described above with reference to FIG. 2 will be described in detail. This operation is to mitigate or release the traffic control level applied at the previous operation if the cell congestion state is mitigated in order to prevent excessive traffic control in the network and to maximize the network usage efficiency. If the service congestion is not detected in the network as the result of the determination at operations 225 to 230 of FIG. 2, and the traffic control for services is being applied, the analytics 170 may determine to release or mitigate the traffic control based on the radio resource usage amounts for the non-specific services of the terminals using the non-specific services (720). At operation 720, the analytics 170 may determine to what extent the traffic control level can be mitigated.

That is, the analytics 170 may calculate to what extent the previously applied MBR is increased based on the current network state in order to prevent the service congestion from occurring, and may provide the corresponding MBR to the network device taking charge of the traffic control to control the traffics for services of the terminals in the cell (730). If the service congestion control is not generated even in case where the configuration is made up to the maximum value in the MBR configuration range as the traffic control level is repeatedly mitigated, and the radio resource usage amount is not larger than a predetermined level, it is determined that the service congestion state is finally solved, and all the traffic controls previously applied can be released.

Figure 8:
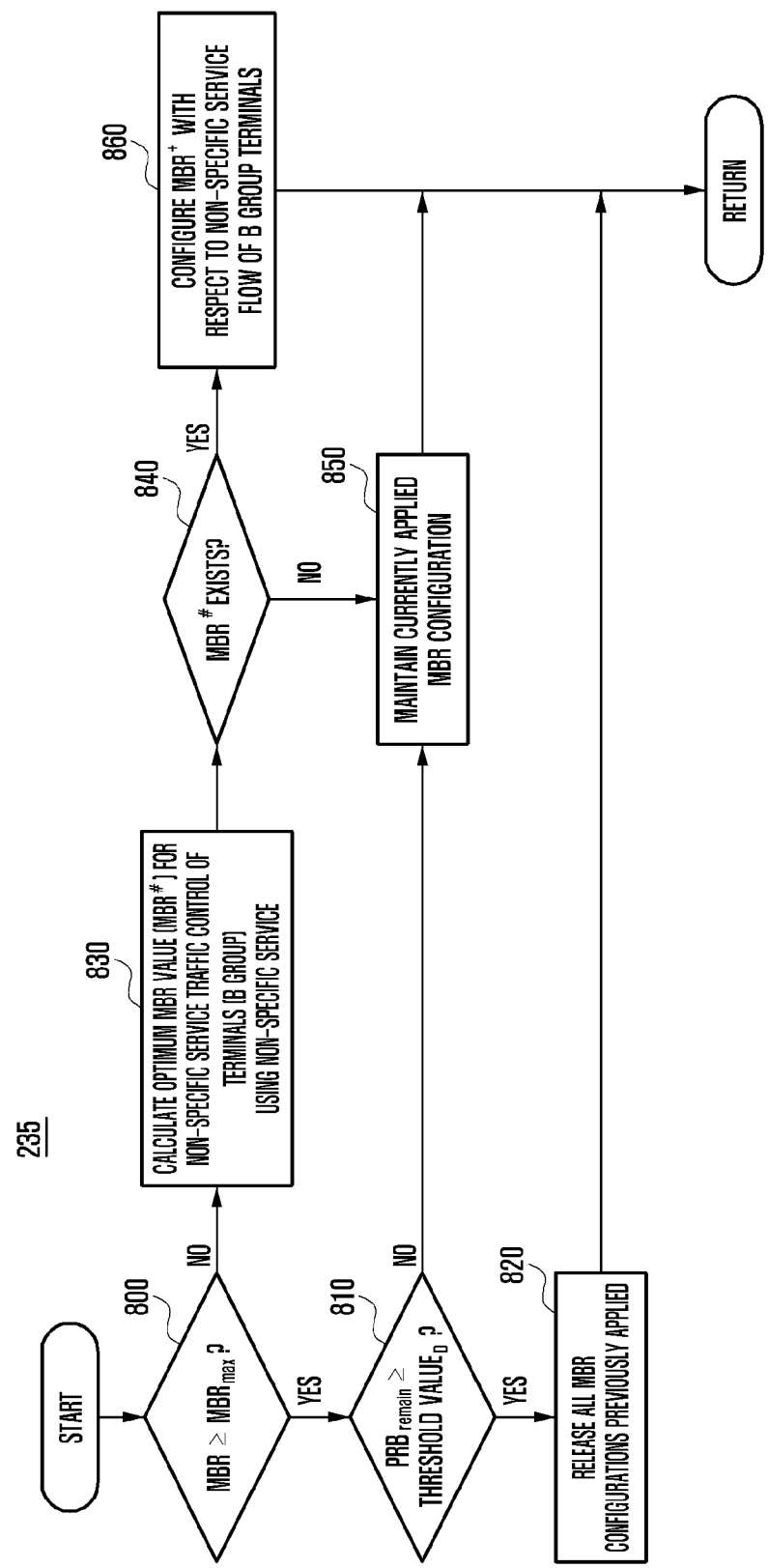
FIG. 8 is a flowchart illustrating a method for releasing or mitigating traffic control of an apparatus according to an embodiment of the present disclosure.

FIG. 8 is a flowchart illustrating a method for releasing or mitigating traffic control of an apparatus according to an embodiment of the present disclosure.

More specifically, referring to FIG. 8, operation 235 of the analytics 170 as described above with reference to FIG. 2 will be described in detail. The analytics 170 may determine whether the MBR configured to the non-specific service flows of the terminals using the non-specific service is equal to or larger than the value $MBR_{MAX}$ predetermined by the service provider. If the MBR configured to the non-specific service flows of the terminals using the non-specific service is equal to or larger than the value $MBR_{MAX}$ predetermined by the service provider, the analytics 170 may determine whether $PRB_{remain}$ that is the radio resource amount remaining in the network is equal to or larger than a threshold $value_D$ (810). In this case, the analytics 170 may determine that the service congestion state is finally solved, and may release all the MBR configurations previously applied (820).

On the other hand, if the MBR configured to the non-specific service flows of the terminals using the non-specific service is smaller than the value $MBR_{MAX}$ predetermined by the service provider, the analytics 170 may calculate the optimum MBR value ($MBR^\#$) for the traffic control of the non-specific services of the terminals using the specific service using mathematical expression 4 below.

[Mathematical expression 4]
$$\left(\sum_{\forall i} Session\_PRB^{UE_B}(i) \times \frac{MBR^\# - TP_a^{UE_B}(i)}{TP_a^{UE_B}(i)}\right) \le PRB_{remain}$$

$$MBR_{min} \le MBR^\# \le MBR_{max},$$

$$MBR_{current} < MBR^\#$$

where $$PRB_{remain} = 1 - Cell\_PRB$$

Session_PRB$^{UE_B}$(i): PRB usage amount of non-specific service sessions of B group terminals
$TP_a^{UE_B}$(i): Actual non-specific service session throughput
$MBR_{current}$: MBR applied to the current B group terminals Through the mathematical expression 4, the maximum value $MBR^\#$ capable of increasing the non-specific service session PRB usage amount of the B group terminal as much as the currently remaining PRB amount is derived, it is identified whether the $MBR^\#$ belongs to a range configured by the service provider, and in addition, it is identified whether the $MBR^\#$ is larger than the currently applied MBR value. The analytics 170 may determine whether the $MBR^\#$ satisfying all the conditions as described above exists (840). If the $MBR^\#$ does not exist, the analytics 170 may maintain the configuration of the currently applied MBR ($MBR_{current}$) (850).

If the $MBR^\#$ exists, the analytics 170 may configure the $MBR^\#$ with respect to the non-specific service flow of the B group terminals (860). On the other hand, if the $PRB_{remain}$ that is the radio resource amount remaining in the network is smaller than the threshold $value_D$ at operation 810, the analytics 170 may maintain the currently applied MBR configuration. After operations 850 and 860, the analytics 170 may return to operation 250 of FIG. 2 to perform the subsequent operation.

Figure 9:
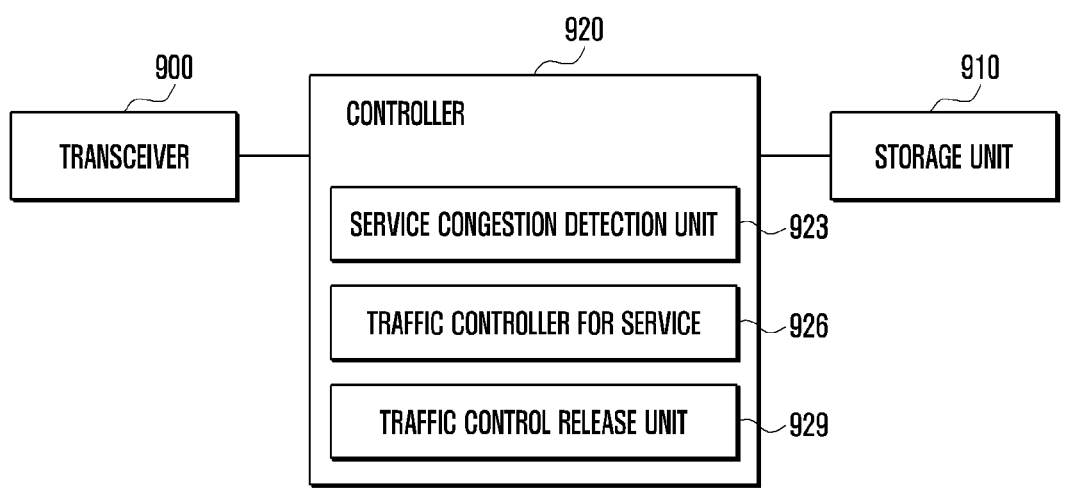
FIG. 9 is a block diagram illustrating the internal structure of an apparatus according to an embodiment of the present disclosure.

FIG. 9 is a block diagram illustrating the internal structure of an apparatus according to an embodiment of the present disclosure.

More specifically, the apparatus may include a transceiver 900, a storage unit 910, and a controller 920. Further, the controller 920 may include a service congestion detection unit 923, a traffic controller 926 for each service, and a traffic control release unit 929.

The transceiver 900 may transmit and receive signals required for the apparatus to perform the operation according to the present disclosure. More specifically, the transceiver 900 may receive information on user service experience quality from a DPI. Further, the transceiver 900 may receive wireless network status information (RAN information) from a base station. Further, the transceiver 900 may transmit the received information to the controller 920, and may provide to a PCRF 140 policy information generated based on this to control traffic for services of a terminal in a wireless network.

The storage unit 910 may store therein information for the apparatus to perform the operation according to the present disclosure. The storage unit 910 may store a message received from the transceiver 900 or the controller 920. The storage unit 910 may store at least one of information on user service experience quality, wireless network status information, and policy information.

The service congestion detection unit 923 included in the controller 920 may determine whether the quality of service experience of a terminal using a specific service has deteriorated in a network. Further, the service congestion detection unit 923 may determine whether a radio resource allocated to the terminal using the specific service is short, and may determine whether the service congestion has occurred based on the number of terminals using the specific service of which the quality of service experience has deteriorated in the network.

The traffic controller 926 for each service included in the controller 920 may select an operation type to control the traffic when the service congestion occurs. Further, the traffic controller 926 for each service may determine a target service to control the traffic by the selected operation type and a control method. Further, in case of controlling the service traffic of the determined target terminal, the traffic controller 926 for each service may determine whether the quality of experience of a terminal user using the specific service can be secured, and if it is determined that the security is possible, the traffic controller 926 may provide control information for controlling the service traffic of the terminals and policy information to the apparatus taking charge of the traffic control.

Further, if the service congestion is not detected, and the traffic control for each service is being applied, the traffic control release unit 926 may determine to release or mitigate the traffic control based on the radio resource usage amount for the non-specific service of the terminal using the non-specific service. Further, the traffic control release unit 929 may perform release or mitigation of the traffic control for each service with respect to the terminal located in the cell.

The service congestion detection unit 923, the traffic controller 926 for each service, and the traffic control release unit 929 in the controller 920 can perform the above-described operations, or the controller 920 may perform all the operations.

The controller 920 may determine whether the service congestion has occurred in the wireless network based on the information on user experience quality for at least one terminal service, and if it is determined that the service congestion has occurred in the wireless network, the controller 920 may control the traffic of the at least one terminal based on the service being used by the terminals in the wireless network. If the service congestion has been mitigated in the wireless network, the controller 920 may control to release the traffic control of the at least one terminal. The information on user experience quality for the service of the at least one terminal may be received from a deep packet inspection (DPI).

The status information in the wireless network may include at least one of a radio resource usage amount for each service of the at least one terminal of which the user experience quality has deteriorated among the at least one terminal, a radio resource usage amount for each service necessary to secure the user experience quality for the service of the at least one terminal of which the user experience quality has deteriorated, and information on the radio resource usage amount for the service that can be used if the residual radio resource in the wireless network is additionally allocated to the at least one terminal of which the user experience quality for the services has deteriorated.

The information on user experience quality for the service of the at least one terminal may be information on user experience quality for the service of at least one terminal using a first service, and the controller 920 may control limiting of traffic of a second service of at least one terminal using the second service excluding the first service among services in the wireless network.

The traffic of the at least one terminal in the wireless network may be controlled based on the radio resource usage amount for securing the user experience quality for the first service of the at least one terminal of which the user experience quality for the first service has deteriorated among the at least one terminal using the first service.

The controller 920 may further control to calculate and apply a maximum bit rate (MBR) to limit the second service of the at least one terminal using the second service, and the maximum bit rate may be determined based on the radio resource usage amount for the first service for securing the user experience quality for the at least one terminal of which the user experience quality for the first service has deteriorated among the at least one terminal using the first service.

The controller 920 may control to block providing of the first service to the at least one terminal among the at least one terminal of which the user experience quality for the first service has deteriorated among the at least one terminal using the first service. If the maximum bit rate (MBR) for limiting the traffic of the service for the at least one terminal in the wireless network is equal to or smaller than a first threshold value, and the radio resource usage amount being used by the at least one terminal in the wireless network is equal to or smaller than a second threshold value, the controller 920 may control to release the traffic control of the at least one terminal.

The controller 920 may derive a first maximum bit rate (MBR) for using a whole residual resource usage amount in the wireless network, and if the first maximum bit rate is higher than a second maximum bit rate pre-applied to the traffic of the service of the at least one terminal in the wireless network, the controller 920 may control to apply the first maximum bit rate to the traffic of the service of the at least one terminal in the wireless network.

In the above-described embodiments, all operations and messages may be targets of selective performance or omission. Further, in the respective embodiments, it is not necessary that operations are performed in order, but the order may be changed. Further, it is not necessary that message transfers happen in order, but the order may be changed. The respective operations and messages may be independently performed.

In the above-described embodiments, a part or the whole of tables exemplarily provided is to help understanding of the embodiments of the present disclosure in detail. Accordingly, detailed contents of tables may be considered to express parts of the method and the apparatus proposed in the description. That is, in the description, it may be preferable that the contents of the tables are accessed in semantics rather than in syntax.

Meanwhile, preferred embodiments of the present disclosure disclosed in this specification and drawings and specific terms used therein are illustrated to present only specific examples in order to clarify the technical contents of the present disclosure and help understanding of the present disclosure, but are not intended to limit the scope of the present disclosure. It will be evident to those skilled in the art that various implementations based on the technical spirit of the present disclosure are possible in addition to the disclosed embodiments.

The invention claimed is:

1. A method performed by a network entity of a mobile communication system, comprising:
   determining that a user experience quality for a first service of at least one terminal among a plurality of terminals using a first service in a wireless network has deteriorated based on user experience quality information on services of the plurality of terminals using the first service and status information of the wireless network;
   determining a maximum bit rate (MBR) to limit traffic of a second service of at least one terminal using the second service excluding the first service among services in the wireless network based on a radio resource usage amount for the first service for securing the user experience quality for the first service of the at least one terminal of which the user experience quality for the first service has deteriorated at the at least one terminal using the first service;
   applying the determined MBR to limit traffic of the second service of the at least one terminal using the second service; and
   allocating a radio resource released from the second service to the first service of the at least one terminal, the radio resource being based on the applying.

2. The method of claim 1, further comprising releasing limiting of the traffic of the second service of the at least one terminal using the second service after the user experience quality for the first service of the at least one terminal has improved.

3. The method of claim 1, wherein the user experience quality information on the services of the plurality of terminals using the first service is received from a deep packet inspection (DPI), and
the status information in the wireless network includes at least one of a radio resource usage amount for services of at least one terminal of which user experience quality has deteriorated among the at least one terminal, a radio resource usage amount for the services necessary to secure the user experience quality for the services of the at least one terminal of which the user experience quality has deteriorated, or information on the radio resource usage amount for the services that can be used if a residual radio resource in the wireless network is additionally allocated to the at least one terminal of which the user experience quality for the services has deteriorated.

4. The method of claim 1, further comprising:
blocking providing of the first service to at least one terminal among the plurality of terminals of which the user experience quality for the first service has deteriorated.

5. The method of claim 2, wherein the releasing the limiting of the traffic of the second service of the at least one terminal using the second service comprises releasing a traffic control of the at least one terminal using the second service if the MBR to limit the traffic of the second service for the at least one terminal in the wireless network is equal to or larger than a first threshold value and the radio resource usage amount being used by the at least one terminal in the wireless network is equal to or smaller than a second threshold value.

6. The method of claim 2, wherein the releasing the limiting of the traffic of the second service of the at least one terminal using the second service comprises:
deriving a first MBR for using a whole residual resource usage amount in the wireless network; and
applying the first MBR to the traffic of the second service of the at least one terminal using the second service if the first MBR is higher than a MBR pre-applied to the traffic of the second service of the at least one terminal using the second service.

7. A network entity apparatus of a mobile communication system, comprising:
a transceiver configured to transmit and receive signals; and
a controller configured to:
determine that a user experience quality for a first service of at least one terminal among a plurality of terminals using a first service in a wireless network has deteriorated based on user experience quality information on services of the plurality of terminals using the first service and status information of the wireless network,
determine a maximum bit rate (MBR) to limit traffic of a second service of at least one terminal using the second service excluding the first service among services in the wireless network based on a radio resource usage amount for the first service for securing the user experience quality for the first service of the at least one terminal of which the user experience quality for the first service has deteriorated at the at least one terminal using the first service,
apply the determined MBR to limit traffic of the second service of the at least one terminal using the second service, and
allocate a radio resource released from the second service to the first service of the at least one terminal, the radio resource being based on the applying.

8. The network entity apparatus of claim 7, wherein the controller is further configured to release limiting of the traffic of the second service of the at least one terminal using the second service after the user experience quality for the first service of the at least one terminal has improved.

9. The network entity apparatus of claim 7, wherein the user experience quality information on the services of the plurality of terminals using the first service is received from a deep packet inspection (DPI), and
the status information in the wireless network includes at least one of a radio resource usage amount for services of at least one terminal of which user experience quality has deteriorated among the at least one terminal, a radio resource usage amount for the services necessary to secure the user experience quality for the services of the at least one terminal of which the user experience quality has deteriorated, or information on the radio resource usage amount for the services that can be used if a residual radio resource in the wireless network is additionally allocated to the at least one terminal of which the user experience quality for the services has deteriorated.

10. The network entity apparatus of claim 7, wherein the controller is further configured to control to block providing of the first service to at least one terminal among the plurality of terminals of which the user experience quality for the first service has deteriorated.

11. The network entity apparatus of claim 8, wherein the controller is further configured to control to release a traffic limitation of the at least one terminal if the MBR to limit the traffic of the second service for the at least one terminal using the second service is equal to or larger than a first threshold value and the radio resource usage amount being used by the at least one terminal using the second service is equal to or smaller than a second threshold value.

12. The network entity apparatus of claim 8, wherein the controller is further configured to derive a first MBR for using a whole residual resource usage amount in the wireless network, and to apply the first MBR to the traffic of the second service of the at least one terminal using the second service if the first MBR is higher than a second MBR pre-applied to the traffic of the second service of the at least one terminal using the second service.

* * * * *